Feb. 14, 1961 R. H. BLAKELEY 2,971,425
BLIND FASTENER HAVING AN EXPANDABLE NUT DRAWN INTO
ENDWISE ABUTMENT WITH WORK SURFACE
Filed Dec. 31, 1956
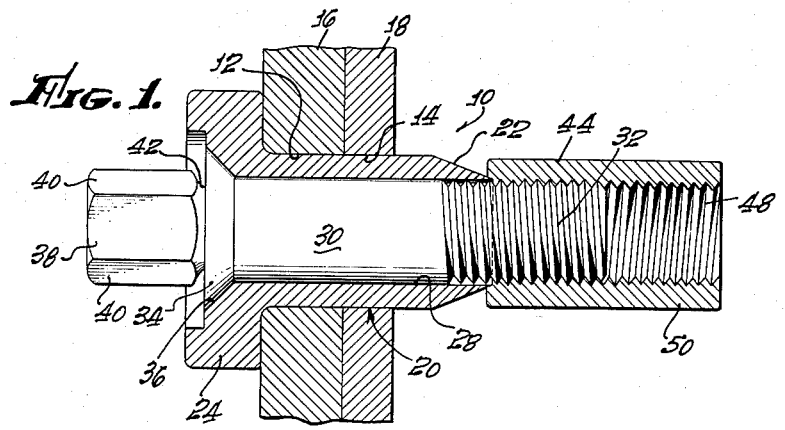
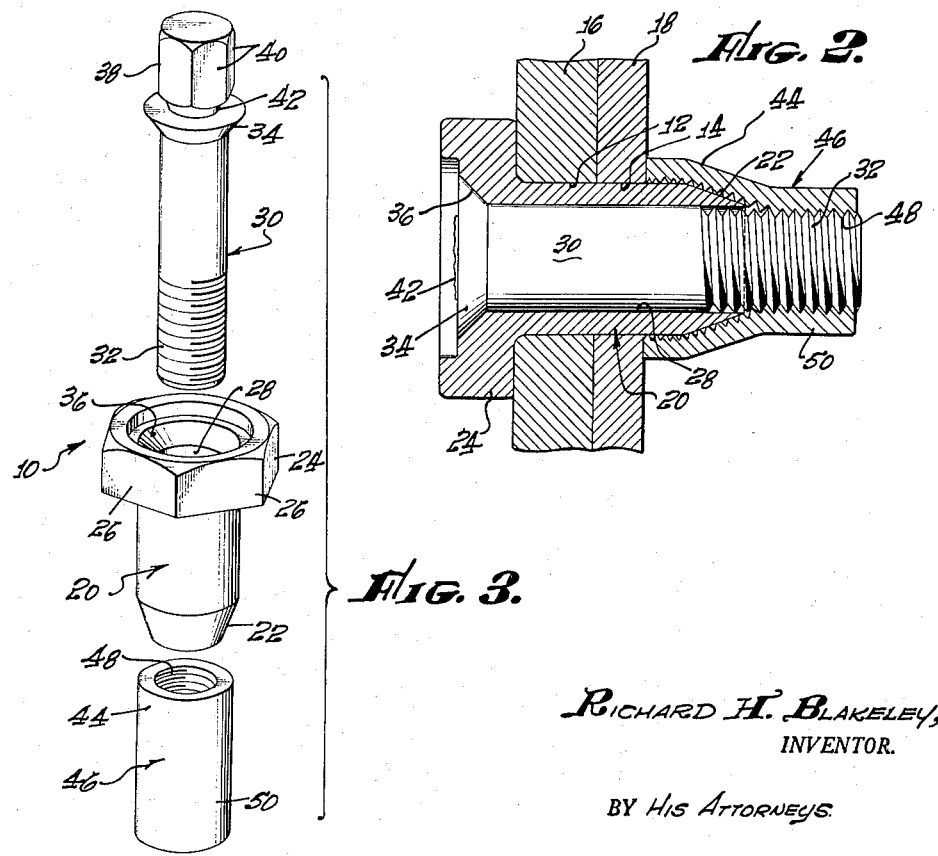
Richard H. Blakeley,
INVENTOR.
BY His Attorneys.
Harris, Kiech, Foster & Harris.

United States Patent Office 2,971,425
Patented Feb. 14, 1961

2,971,425

BLIND FASTENER HAVING AN EXPANDABLE NUT DRAWN INTO ENDWISE ABUTMENT WITH WORK SURFACE

Richard H. Blakeley, 2608 Via Ramon, Palos Verdes Estates, Calif.

Filed Dec. 31, 1956, Ser. No. 631,536

4 Claims. (Cl. 85—40)

The present invention relates in general to blind fasteners and, more particularly, to a blind fastener of the threaded variety, a primary object of the invention being to provide an improved blind fastener of this type.

Generally speaking, the invention contemplates a blind fastener which includes: a cylindrical bushing having a convergent inner end and having at the outer end thereof a head adapted to seat on one of two or more members to be fastened together, the bushing also having an outwardly facing screw head seat at the outer end thereof; a screw extending through the bushing and having an inner end projecting inwardly beyond the convergent inner end of the bushing, the screw also having at the outer end thereof a head which is engageable with the screw head seat on the bushing; and a nut threaded on the inner end of the screw and having inner and outer ends, the outer end of the nut being engageable with the convergent inner end of the bushing and being expansible thereover into engagement with another of the members to be secured together by the fastening device, in response to axial movement of the nut toward the bushing as the result of rotation of the screw relative to the nut, whereby the members to be secured together are clamped between the outer end of the nut and the head on the bushing.

An important object of the invention is to provide a blind fastener of the foregoing nature wherein the outside diameter of the nut is slightly less than the outside diameter of the bushing so that the nut acts as a pilot to guide the fastener into holes through members to be secured together. This insures easy insertion of the fastener into holes with which the bushing has an interference fit, and also compensates for relative eccentricities of the bushing and the nut resulting from manufacturing inaccuracies.

Another object of the invention is to provide a nut which is threaded internally throughout its entire length and which has substantially constant cross-sectional dimensions through its entire length. Thus, the portion of the nut which is expanded over the bushing, i.e., the outer end of the nut, and the portion of the nut which remains in threaded engagement with the screw upon expansion of the outer end of the nut over the bushing, i.e., the inner end of the nut, are both internally threaded. This provides the nut with a greater available bearing surface against that one of the members to be secured together which it engages, and also provides the nut with a greater column strength by providing it with a smaller $L/d$ ratio, which are important features.

Another object of the invention is to provide a nut the outer end of which is relatively soft for easy expansion over the bushing without splitting, and the inner end of which is relatively hard to provide greater thread strength and elasticity in the portion of the nut which remains in threaded engagement with the screw.

Still another object of the invention is to radially deform the nut slightly to provide an interference fit between the pitch diameters of the threads of the nut and the screw, which prevents loosening of the nut under severe vibration, and the like. A related object is to deform the nut so that it is slightly elliptical to achieve the desired binding effect on the screw.

Yet another object is to provide a screw having a second head axially outwardly of the first head mentioned and to provide in the screw between the two heads an annular break-off groove. The outer head is engageable by a tool for rotating the screw and, once the outer end of the nut has been expanded over the bushing to clamp the members to be secured together between the head on the bushing and the outer end of the nut, the screw fails in torsional shear at the break-off groove therein to permit applying the present invention to flush constructions.

Another object of the invention is to provide a blind fastener having some or all of the foregoing features.

The foregoing objects, advantages, features and results of the present invention, together with various other objects, advantages, features and results thereof which will be apparent to those skilled in the art in the light of this disclosure, or which are inherent in the original claims hereinafter presented, may be attained with the exemplary embodiment of the invention described in detail hereinafter and illustrated in the accompanying drawing, in which:

Fig. 1 is a longitudinal sectional view of a blind fastener of the invention which has been inserted through holes in members to be secured together, but which has not as yet been set;

Fig. 2 is a view similar to Fig. 1, but showing the blind fastener of the invention after it has been set; and Fig. 3 is an exploded perspective view of the blind fastener of the invention before setting thereof.

Referring to the drawing, the numeral 10 designates a blind fastener of the invention which is insertable through holes 12 and 14 in members 16 and 18 to be secured together. As is typical of blind fasteners, the fastener 10 may be installed and set from one side of the members 16 and 18 in a manner which will become apparent.

The fastener 10 includes a cylindrical bushing 20 which is insertable into the holes 12 and 14 and which may, if desired, have an interference fit, or even a press fit, with the peripheral walls thereof. The bushing 20 is provided inwardly of the members 16 and 18 with an inwardly convergent or tapered inner end 22 and is provided at its outer end, outwardly of the members 16 and 18, with a head 24 adapted to seat on the outer member 16. The head 24 is provided with surfaces 26 engageable by a suitable tool, not shown, for preventing rotation thereof during setting of the fastener 10, the surfaces 26 being the flats of a hexagonal head in the particular construction illustrated. It will be understood that various configurations may be employed for the head 24 and that the invention is not to be regarded as limited to the particular hexagonal configuration shown. For example, the head 24 may be frusto-conical and countersunk into the outer member 16 and may be provided with suitable notches for the reception of a tool for preventing rotation of the bushing 20, such a configuration for the head 24 being particularly advantageous where a flush outer surface for the member 16 is desired. Various other configurations for the head 24 may also be employed.

The bushing 20 is provided with an axial bore 28 for a screw 30 which is longer than the bushing so that it extends therethrough. The screw 30 is provided with a threaded inner end 32 which projects inwardly beyond the tapered inner end 22 of the bushing 20. The screw 30 is provided adjacent its outer end with a head 34 adapted to seat on an annular, outwardly facing, screw head seat 36 at the outer end of the bushing 20. In the particular construction illustrated, the screw head 34 is frustoconical and the seat 36 is complementarily tapered so that the screw head is countersunk into the bushing 20, this construction being similar to the alternative construction hereinbefore outlined for the bushing head 24.

Outwardly of the screw head 34 and also forming part of the screw 30 is another head 38 having surfaces 40 engageable by a suitable tool, the surfaces 40 being the flats of a hexagonal head in the particular construction illustrated. Between the heads 34 and 38 is an annular break-off groove 42 in the screw 30, the latter being adapted to fail at the groove 42 in torsional shear in response to a rotational force applied to the head 38 after the fastener 10 has been set, thereby providing the screw 30 with a flush configuration relative to the bushing 20. If the alternative bushing head structure hereinbefore discussed, wherein the bushing head is frustoconical and countersunk into the member 16, is utilized, the entire outer surface of the member 16 is flush upon shearing off of the screw 30 at the groove 42.

It will be understood that while a particular screw head configuration, incorporating the inner and outer screw heads 34 and 38, has been disclosed, various other screw head configurations may also be utilized. For example, the outer screw head may be omitted and the screw head 34 may be provided with screw driver slots, tool receiving notches, or the like. Still other screw head configurations may be utilized, if desired.

Threaded on the inner end 32 of the screw 30 in engagement with the tapered inner end 22 of the bushing 20 is the outer end 44 of a cylindrical nut 46 having the form of a sleeve provided with an internally threaded bore 48. Prior to setting of the fastener 10, the inner end 50 of the nut 46 projects inwardly beyond the inner end 32 of the screw 30. The outside diameter of the nut 46 is slightly less than the outside diameter of the bushing 20 so that the nut acts as a pilot facilitating insertion of the fastener 10 into the holes 12 and 14 into the position of Fig. 1 of the drawing. Also, this compensates for any relative eccentricity of the bushing 20 and the nut 46 resulting from inaccuracies in the manufacture of the bushing, the nut and the screw 30.

The nut 46 is threaded throughout its entire length and is provided with internal transverse dimensions which are substantially constant throughout its entire length, instead of threading only the inner end 50 of the nut and counterboring the outer end 44 thereof, for example. This provides the outer end 44 of the nut 46 with a greater bearing surface for engagement with the inner surface of the member 18 and also provides the nut with greater column strength since threading the nut throughout its entire length provides it with a smaller L/d ratio.

The outer end 44 of the nut 46 is preferably relatively soft compared to the inner end 50 thereof to permit radial expansion of the outer end of the nut over the bushing 20 without splitting, or other rupturing, of the outer end of the nut. The increased hardness of the inner end 50 of the nut 46 results in the provision of a thread strength and elasticity sufficient to prevent stripping of the threads in the inner end of the nut as the screw 30 is rotated to expand the outer end 44 of the nut over the bushing 20. Providing the nut 46 with a relatively soft outer end 44 and a relatively hard inner end 50 permits the utilization of a single unit capable of performing the desired functions, which is an important feature.

Preferably, the nut 46 and the screw 30 are provided with standard threads having modified major and minor diameters, the major diameters being less than standard and the minor diameters greater than standard. The nut 46 is also deformed radially slightly to effect an interference fit between the pitch diameters of the threads of the screw 30 and the nut so that the nut will not back off, after setting of the fastener 10, even under conditions of severe vibration, and the like. Preferably, the nut is deformed into a slightly elliptical cross-sectional configuration, although other configurations may be utilized. Such deformation of the nut, which may be confined to the hardened inner end 50 thereof, may be effected before or after hardening of the inner end of the nut. Such hardening may be achieved in various ways, as by cold working, induction hardening, or the like.

Considering the operation of the invention, the fastener 10 is inserted through the holes 12 and 14 into the position shown in Fig. 1 of the drawing, being driven into the holes in the case of an interference fit, or a press fit. The insertion of the fastener 10 is facilitated because of the fact that the nut 46 acts as a pilot, the outside diameter thereof being less than the outside diameter of the bushing 20. Thus, the assembly can readily be inserted into holes having a diameter equal to or slightly less than the diameter of the bushing 20.

Once the bushing head 24 is firmly seated against the outer member 16, suitable tools are applied to the bushing head 24 and to the screw head 38, or suitable components of a single tool are applied to such heads. By means of such a tool or tools, the bushing 20 is prevented from rotating and the screw 30 is rotated. This rotation of the screw 30 causes axial movement of the nut 46 toward the bushing 20, the nut being prevented from rotation by initial engagement of the outer end 44 thereof with the tapered inner end 22 of the bushing. As the nut 46 is moved axially toward the bushing 20 in response to rotation of the screw 30 while the bushing is held stationary, the outer end 44 of the nut expands over the tapered inner end 22 of the bushing and over the adjacent cylindrical portion of the bushing until the outer end of the nut is seated firmly against the inner surface of the inner member 18, such expansion of the outer end of the nut taking place without splitting, or other rupturing thereof, due to its relative softness. At the same time, the hardness of the inner end 50 of the nut insures adequate thread strength to induce the aforementioned expansion of the outer end of the nut without stripping of the threads in the nut.

Once the outer end 44 of the nut 46 has been brought into firm engagement with the inner surface of the inner member 18 to clamp the members 16 and 18 between the nut 46 and the bushing head 24, further rotation of the screw 30 results in failure thereof at the breakoff groove 42 in torsional shear, thereby providing a flush structure for the screw relative to the bushing 20.

The hereinbefore described thread structure for the nut 46 and the screw 30 affects an interference fit between the pitch diameters of the threads on the nut and the screw to prevent loosening of the nut even under conditions of severe vibration, or the like.

While an exemplary embodiment of the invention has been specifically disclosed herein for purposes of illustration, it will be understood that various changes, modifications and substitutions may be incorporated in such embodiment without departing from the spirit of the invention as defined by the claims which follow.

I claim:

1. In a blind fastener, the combination of: a bushing having a convergent inner end and having a head at the outer end thereof, said bushing also having an outwardly facing screw head seat; a screw extending through said bushing and having an inner end projecting inwardly beyond said convergent inner end of said bushing, said screw also having a head which is engageable with said screw head seat; and a circumferentially continuous nut threaded on said inner end of said screw and having inner and outer ends, said outer end of said nut being engageable with said convergent inner end of said bushing and being expansible thereover in response to axial movement of said nut toward said bushing as the result of rotation of said screw relative to said nut, the outside diameter of said nut being less than the outside diameter of said bushing, said nut being internally threaded throughout its entire length and having substantially constant internal cross-sectional dimensions throughout its entire length.

2. In a blind fastener, the combination of: a bushing having a convergent inner end and having a head at the outer end thereof, said bushing also having an outwardly facing screw head seat; a screw extending through said bushing and having an inner end projecting inwardly beyond said convergent inner end of said bushing, said screw also having a head which is engageable with said screw head seat; and a circumferentially continuous nut threaded on said inner end of said screw and having inner and outer ends, said outer end of said nut being engageable with said convergent inner end of said bushing and being expansible thereover in response to axial movement of said nut toward said bushing as the result of rotation of said screw relative to said nut, said nut being internally threaded throughout its entire length and having substantially constant internal cross-sectional dimensions throughout its entire length.

3. In a blind fastener, the combination of: a bushing having a convergent inner end and having a head at the outer end thereof, said bushing also having an outwardly facing screw head seat; a screw extending through said bushing and having an inner end projecting inwardly beyond said convergent inner end of said bushing, said screw also having a head which is engageable with said screw head seat; and a circumferentially continuous nut threaded on said inner end of said screw and having inner and outer ends, said outer end of said nut being engageable with said convergent inner end of said bushing and being expansible thereover in response to axial movement of said nut toward said bushing as the result of rotation of said screw relative to said nut, said outer end of said nut being softer than said inner end thereof, said nut being internally threaded throughout its entire length and having substantially constant internal cross-sectional dimensions throughout its entire length.

4. In a blind fastener, the combination of: a bushing having a convergent inner end and having a head at the outer end thereof, said bushing also having an outwardly facing screw head seat; a screw extending through said bushing and having an inner end projecting inwardly beyond said convergent inner end of said bushing, said screw also having a head which is engageable with said screw head seat; and a circumferentially continuous nut threaded on said inner end of said screw and having inner and outer ends, said outer end of said nut being engageable with said convergent inner end of said bushing and being expansible thereover in response to axial movement of said nut toward said bushing as the result of rotation of said screw relative to said nut, the outside diameter of said nut being less than the outside diameter of said bushing, and said nut being internally threaded throughout its entire length and having substantially constant internal dimensions throughout its entire length.

References Cited in the file of this patent

UNITED STATES PATENTS

| | | |
|---|---|---|
| 522,247 | Wilson | July 3, 1894 |
| 2,148,977 | Buck | Feb. 28, 1939 |
| 2,381,113 | Cook | Aug. 7, 1945 |
| 2,385,991 | Huntoon | Oct. 2, 1945 |
| 2,516,554 | Coyne | July 25, 1950 |
| 2,670,021 | Torresen | Feb. 23, 1954 |
| 2,760,399 | Rea | Aug. 28, 1956 |

FOREIGN PATENTS

| | | |
|---|---|---|
| 91,195 | Switzerland | Oct. 17, 1921 |
| 525,695 | Great Britain | Sept. 3, 1940 |